Figure 3:
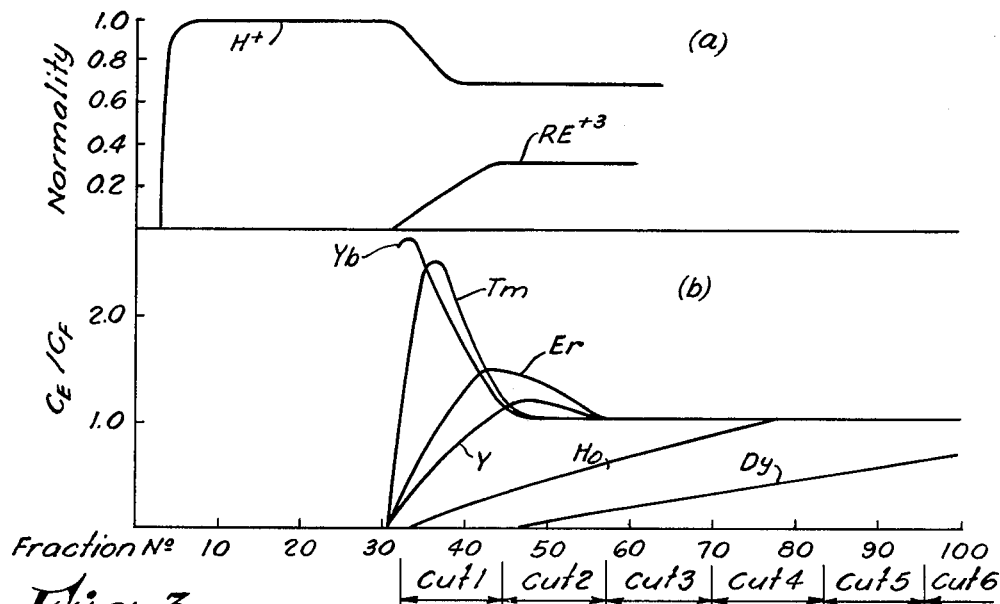

Oct. 6, 1964  H. SMALL  3,151,931
METHOD OF EXTRACTIVELY SEPARATING MIXED METALLIC SPECIES
Filed Sept. 2, 1959  2 Sheets-Sheet 2

INVENTOR.
Hamish Small
BY
Theodore Post
ATTORNEY

Oct. 6, 1964  H. SMALL  3,151,931
METHOD OF EXTRACTIVELY SEPARATING MIXED METALLIC SPECIES
Filed Sept. 2, 1959  2 Sheets-Sheet 1

INVENTOR.
Hamish Small
BY
Therdon Post
ATTORNEY 3,151,931
METHOD OF EXTRACTIVELY SEPARATING MIXED METALLIC SPECIES
Hamish Small, Midland, Mich., assignor to The Dow Chemical Company, Midland, Mich., a corporation of Delaware
Filed Sept. 2, 1959, Ser. No. 837,628
10 Claims. (Cl. 23—14.5)

This invention concerns a method for the extractive separation of mixed heavy metal species. More particularly it concerns a method for extractively separating mixed heavy metal species by a procedure involving an aqueous extraction with a novel stationary aqueous phase, an ion exchange resin having the aqueous extracting medium absorbed in its granules, whereby the heavy metal species are selectively extracted from their solution in a water-immiscible organic medium and eluting the absorbed metal values by contact with a water-immiscible liquid organic medium which is a selective solvent for the metal values.

This invention differs from the known art of countercurrent liquid-liquid extraction in that the aqueous phase is replaced by a stationary column of ion exchange resin particles swollen with absorbed water. In this way, one benefits from the low theoretical plate height (many theoretical stages) of a column chromatographic technique. In addition, the process of this invention does not suffer from emulsification problems and accompanying entrainment losses encountered in conventional liquid-liquid extraction processes. This invention is particularly applicable to the separation of rare earths and thorium from rare earths.

In one aspect of this invention, a column of an anion exchange resin in the salt form, the particles of which are water swollen to any desired extent up to the maximum (maximum swelling resulting when the resin is contacted with water until it no longer swells, as determined by a simple test) is contacted with a solution of heavy metal salts of an inorganic acid in a solvent which contains a water-immiscible organic liquid in which the salts are soluble as ion association complexes, containing, if desired, a small amount of an inert organic water-immiscible diluent. The heavy metal salts are thereby selectively distributed between the organic and aqueous phases. Thereafter, the metal salts absorbed in the water held by the anion exchange resin particles are selectively eluted with a water-immiscible organic liquid in which they are soluble.

Any amine type organic anion exchange resins, e.g., those disclosed in U.S. Patents 2,591,573 and 2,591,574 and equivalents thereof, are operable in this process. As solvents for the heavy metal salts of inorganic acids are used those water-immiscible liquid organic media as are known to dissolve the particular species by ion association, e.g., the trialkyl phosphates having from 4 to 20 carbon atoms per alkyl group of the straight or branched chain types, such as tri-n-butyl, tri(2-ethylhexyl), tridecyl, tri-tetradecyl, tri-octadecyl, tri-eicosyl, and similar types. Typical solvents are indicated by Morrison and Freiser, Solvent Extraction in Analytical Chemistry, 1957, pp. 4–6, and in sections of Part 3 of their book, pp. 125–156. The water-immiscible organic solvents are those which will not mix with water but which will dissolve or extract heavy metal salts of inorganic acids dissolved in water by forming ion association complexes. The water-immiscible solvents are used as such or in admixture with a water-immiscible diluent, e.g., an aromatic hydrocarbon, kerosene, etc.

A simple trial suffices to determine the rate of feed of the liquid organic water-immiscible solution of metal salts to the water-swollen anion exchange resin column, since the rate of feed varies with the type of metal species to be separated as well as with the concentration of the organic phase. The amount of absorbed water desirable in the water-swollen anion exchange resin column will vary also with the type of metal species to be separated as well as with the concentration of the organic phase, and likewise can be determined by a simple trial. These aspects of the invention can be set forth only generally because the invention is widely applicable to so many different heavy metal species.

In another aspect of this invention, a column of a cation exchange resin in the acid form, the particles of which are swollen with absorbed water, is contacted with a solution of heavy metal salts in an acidic ester of phosphoric acid, i.e., a monoalkyl or dialkyl ester of phosphoric acid, if desired also containing a water-immiscible inert organic liquid diluent, e.g., an aliphatic or aromatic hydrocarbon or mixture thereof, such as kerosene or toluene or equivalents. The heavy metal species as salts of acidic alkyl phosphates, selectively exchange onto the cation exchange resin column. The metallic species are thereafter selectively eluted, using the same or a different acidic ester of phosphoric acid as was used in preparing the organic solution of mixed metal salts of the acidic phosphate ester. Operable cation exchange resins are the well known sulfonic acid and carboxylic acid types, of which the former are preferred. Representative cation exchange resins useful in the practice of the invention are disclosed in U.S. Patent 2,366,007.

Metal salts are those of the acidic monoalkyl and dialkyl esters of phosphoric acid, the alkyl groups of which contain from 4 to 20 carbon atoms of the straight or branched chain types.

Instead of using an organic water-immiscible solution of metal salts of an acidic phosphoric acid ester, a solution of heavy metal salts of an inorganic acid in such an organic solvent for such salts as was disclosed in the first aspect of this invention can be used. When contacted with water-swollen particulate cation exchange resins, the heavy metal species are selectively extracted by the water in the resin and exchanged onto the ion exchange column. Thereafter, the metal species are eluted selectively using an acidic alkyl phosphoric acid ester as such or admixed with an inert water-immiscible organic diluent such as kerosene or toluene. Alternatively, acidic solutions of a mineral acid and a water-immiscible organic solvent such as was disclosed in the first aspect of this invention can be used for elution.

In the first aspect of this invention, the anion exchange resin is advantageously surface etherified or treated with a small percentage of an ionic wetting agent to inhibit agglomeration of the resin particles in the organic solvents. Etherification is carried out by refluxing the cross-linked vinylaromatic resin containing halomethyl groups on the aromatic nuclei, used in making the anion exchange resins, with a solution in ethanol of about 4 percent sodium hydroxide sufficient to cover the resin beads. Because of inherently poor penetration of the alcohol into the resin beads containing halomethyl groups, the etherification reaction is restricted to a surface skin. Reflux time of about 3 hours suffices, after which the surface etherified beads are washed free of sodium hydroxide and sodium chloride with ethanol. The resin beads are thereafter converted to polyamine or quaternary ammonium anion exchange resin in the usual manner. In the second aspect of this invention, wherein an organic solution of heavy metal salts of monoalkyl or dialkyl phosphoric acid esters is contacted with a column of water-swollen cation exchange resin, it is preferable that the resin not be completely water-swollen, otherwise a barrier layer of water forms on the surface of the beads and interferes with exchange of metallic species between the organic solution and the cation exchange resin. In general, the water content should not exceed about 80 percent of the completely water-swollen resin in order to permit good absorption. This is accomplished by air drying the water-swollen cation exchange resin to an appropriate water content not exceeding 80 percent of the completely water-swollen state or by rehydrating air dried cation exchange resin by suspending it in a hydrocarbon, e.g., toluene, containing a small amount of an emulsifying agent and gradually adding water while agitating the mixture. The water becomes emulsified and is absorbed by the resin. Addition of water is stopped at the desired level. In all aspects of this invention, the interstitial volume of the resin bed is occupied by a water-immiscible liquid organic medium which is miscible with the organic solution of the heavy metal speces to be separated.

The following examples are in illustration of the invention and are not limitative thereof.

EXAMPLE 1

Thorium-Rare Earth Separation (1) Preparation of resin and resin column. A surface etherified quaternary ammonium anion exchange resin, as described above, was used. The surface treated resin was loaded into a ½" I.D. burette type column with xylene occupying the interstitial volume of the resin bed.

Resin: Dowex 1X4 ($NO_3^-$) quaternary ammonium resin, 20–50 mesh, surface etherfied, 48 percent water; volume of bed 90 mls.

(2) Preparation of feed solution. The feed solution was prepared as follows: solutions of thorium nitrate and rare earth (RE) nitrates (Lindsay "Didymium Nitrate" Code No. 450) in 50/50 volume: tri-n-butyl phosphate (T.B.P.)/xylene were prepared by shaking a volume of the mixed solvents with the respective solid nitrates. Equal volumes of the resulting nitrate solutions were mixed to give the feed solution. The composition of the feed solution was: 0.28 M in Th ($NO_3$)$_4$; 0.21 M in RE ($NO_3$)$_3$.

(3) One hundred mls. of the above feed solution was loaded onto the prepared column at a flow rate of approximately 1 ml./min.

(4) Elution. Two eluants were used to effect separation. After loading, the column was first eluted with 80 mls. of a 50/50 mixture of T.B.P./xylene by volume. This was followed by an elution with an 80/20 mixture of T.B.P./xylene.

Figure 1:
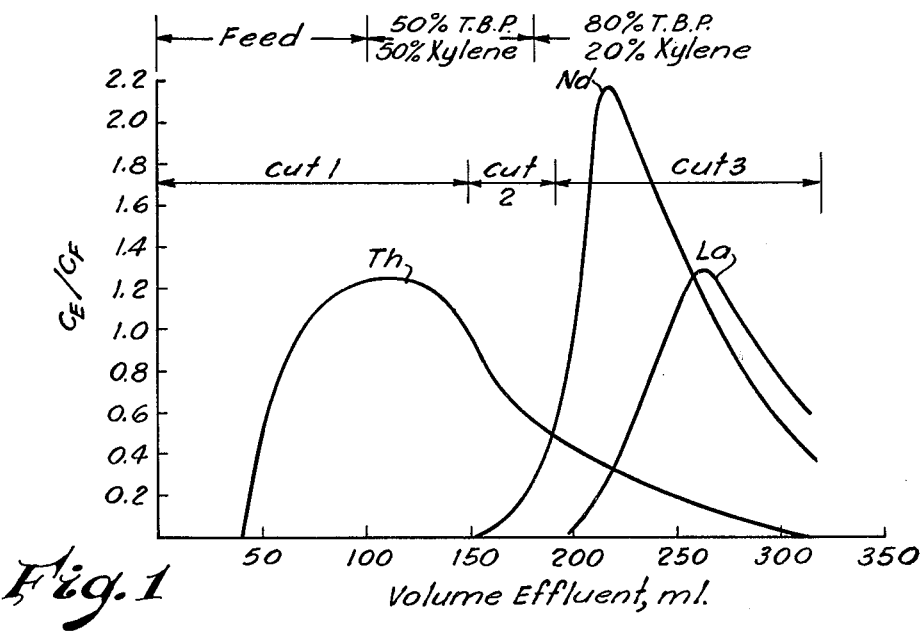

(5) Analysis. Fractions of the effluent product were collected and analyzed by X-ray fluorescence. The locations of the thorium and the two major rare earths in the effluent are illustrated in the accompanying FIGURE 1, wherein $C_E/C_F$ is concentration in effluent to concentration in feed. Three large cuts from the effluent product, denoted cuts 1, 2 and 3 on FIGURE 1, were extracted with water. The metals in these extracts were precipitated as their oxalates which were then washed, dried, and ignited to the oxides. The composition of these cuts is given in the table below:

TABLE I.—SEPARATION OF THORIUM FROM RARE EARTHS

| Cut No. | Percent Metal in Oxide | | | | | |
|---|---|---|---|---|---|---|
| | Th | Nd | La | Pr | Sm | Gd |
| 1 | 100 | | | | | |
| 2 | 30.2 | 1.5 | | 0.1 | 1.1 | 0.5 |
| 3 | 5.7 | 13.8 | 5.4 | 2.6 | 2.2 | 0.9 |

It was possible by this procedure to obtain a cut which contained pure thorium nitrate.

EXAMPLE 2

Rare Earth Separation (1) Preparation of the resin and the resin column. A surface etherified Dowex 1 resin was used. A column of resin was prepared by placing the resin in a ½ in. I.D. burette type column with kerosene occupying the interstitial volume.

Resin: Dowex 1 ($NO_3^-$) resin 20–50 mesh, surface etherified 48 percent water; volume of bed=85 ml.

(2) Preparation of the feed. Feed was prepared by shaking an organic phase (80 percent V.V.T.B.P./20 percent V.V. kerosene) with the solid rare earth nitrates. The source of the nitrates was Lindsay's "Didymium Nitrate," Code No. 450. The rare earth nitrates dissolved in the organic phase to give a solution which was approximately 0.7 M in rare earth nitrates.

(3) Application of feed solution to column. Eighty-five ml. of the above solution was loaded onto the prepared column at a flow rate of approximately 1 ml./min.

(4) Elution. An elution was carried out using 80 percent T.B.P. in kerosene as eluant at a flow rate of ca. 1 ml./min.

(5) Analysis. Fractions of the effluent solution were collected and analyzed by X-ray fluorescence.

Figure 2:
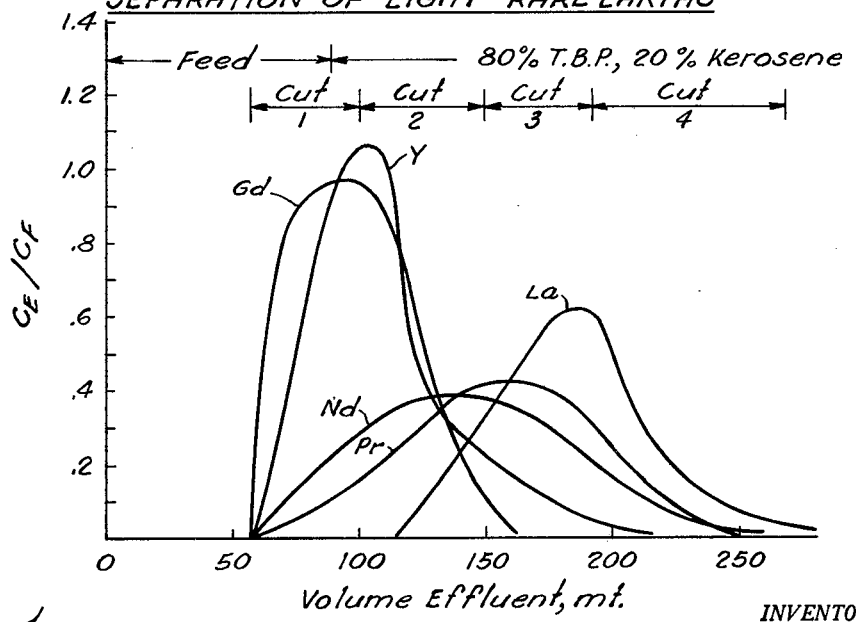

The elution waves of the individual rare earths are shown in the accompanying FIGURE 2. The levels of rare earth in the effluent are expressed as the ratio:

$$C_E/C_F = \frac{\text{concn. of rare earth in effluent}}{\text{concn. of rare earth in feed solution}}$$

Large cuts of the effluent product, denoted cuts 1, 2, 3 and 4 on FIGURE 2, were extracted with water and the rare earths precipitated as their oxalates from these aqueous extracts. The oxalates were filtered, washed, dried and ignited to the oxides. A quantity of the feed solution was treated in the same way. An X-ray fluorescence analysis of these oxide samples was obtained and the results quoted below demonstrate further the separation obtained:

TABLE II.—ANALYSIS OF OXIDES

| Cut No. | Percent Metal in Oxide | | | | | | |
|---|---|---|---|---|---|---|---|
| | Y | Dy | Sm | Gd | Nd | Pr | La |
| Feed | 1.2 | 0.7 | 7.2 | 2.5 | 52.0 | 7.7 | 8.3 |
| 1 | 1 | 2 | 18.6 | 11 | 47 | 3 | |
| 2 | 0.8 | 1 | 10.8 | 6.6 | 53.5 | 7 | 2 |
| 3 | 0.4 | 0.1 | 5.7 | 1.2 | 57.0 | 8 | 10.6 |
| 4 | 0.3 | 0.05 | 2.8 | 0.1 | 52.0 | 9 | 21.0 |

EXAMPLE 3

(a) *Preparation of resin.*—A quantity of Dowex 50X4 (H+ form) sulfonic acid cation exchange resin, 50–75 mesh, was air-dried and its water content determined. This resin was added to about five times its volume of toluene containing about one percent of a non-ionic emulsifying agent, glyceryl trioleate. The suspension of resin in toluene was rapidly agitated and water added slowly to the mixture. The water became emulsified in the toluene and in turn was absorbed by the dried resin. Addition of water was stopped when the moisture content of the resin reached 50 percent. The amount of water to be added was calculated knowing the weight of air-dried resin and its initial water content. The resin was then loaded into a ½" I.D. burette type column with toluene as the fluid occupying the interstitial volume of the bed. The volume of the bed was 47 ml. and its depth 12 in.

(b) *Preparation of feed solution.*—The feed solution was prepared as follows:

A quantity of 25.5 g. of rare earth carbonate (equivalent weight 76.2) was added to 1115 ml. of a 1 M solution of di(2-ethylhexyl) phosphoric acid in toluene. The suspension was stirred and all but a small amount of the solids dissolved. The solution was filtered to remove insoluble matter. The composition of the feed solution was 1 M in di(2-ethylhexyl) phosphate, 0.67 N in exchangeable hydrogen and 0.31 N in rare earths.

(c) *Loading.*—The above feed solution was loaded to the prepared bed at a flow rate of 0.5 to 0.6 ml./minute.

The volume of feed applied was approximately 870 ml., i.e., 18.5 bed volumes.

(d) *Elution.*—No elution with the alkyl phosphoric acid was attempted in this run, which was primarily designed to determine the break-through of the individual rare earths by essentially a frontal analysis technique. The composition of the rare earths held by the column after loading was, however, determined as described under (e).

(e) *Analysis.*—The effluent was collected in fractions (each fraction ca. 7.80 ml.) and analyzed by X-ray fluorescence.

The exchangeable hydrogen ion content of individual cuts was determined by titration with sodium hydroxide. The concentration of the total rare earths in the same cuts was obtained by difference. In the accompanying FIGURE 3 two plots are presented:

(a) a plot showing the break-through of the total rare earths ($RE^{+3}$) and (b) a plot showing the break-through of the individual rare earths.

The level of an individual rare earth in the effluent is plotted as the ratio $$C_E/C_F = \frac{\text{Concentration in the effluent}}{\text{Concentration in the feed}}$$

The relative separations for the rare earths is amply demonstrated by the (b) plot. Six larger cuts of effluent were made, denoted by cuts 1, 2, etc., on the (b) plot, and these cuts were extracted with 3 M HCl and the rare earths of the extract precipitated as their oxalates, washed, filtered and dried. The rare earth content of these six cuts was determined by X-ray fluorescence.

At the same time a sample of rare earth carbonate feed material was also analyzed. The resin in the column after the loading cycle was removed from the column, washed with acetone and eluted with 3 M HCl. The rare earths in the eluant were precipitated as oxalates washed, filtered, dried, and analyzed by X-ray fluorescence. The analysis of the six product cuts, the feed and the resin product are given in the table below. The analysis figures are normalized to yttrium as 100.

|   | Y | Yb | Tm | Er | Ho | Dy | Tb | Gd | Eu | Nd | Ce | La |
|---|---|----|----|----|----|----|----|----|----|----|----|----|
| Feed | 100 | 1.4 | .36 | 4.8 | 2.9 | 19.5 | 2.5 | 7.3 | .05 | .18 | .36 | .35 |
| Cut 1 | 100 | 2.6 | 1.0 | 8.8 | 1.0 | 1.0 | | | | | | |
| Cut 2 | 100 | .9 | .24 | 6.8 | 1.3 | 2.3 | | | | | | |
| Cut 3 | 100 | .5 | | 6.0 | 2.0 | 4.5 | | | | | | |
| Cut 4 | 100 | .5 | | 6.0 | 2.7 | 6.7 | | | | | | |
| Cut 5 | 100 | .5 | | 6.2 | 3.1 | 11.0 | .44 | | | | | |
| Cut 6 | 100 | .5 | | 5.6 | 3.7 | 17.5 | .62 | .25 | | .6 | | |
| Resin Product | 100 | | | 5.0 | 2.5 | 29.0 | 5.0 | 17.5 | 0.1 | 2.3 | .25 | .5 |

EXAMPLE 4

*Separation of the Rare Earths Lu, Yb and Tm*

(a) *Preparation of resin.*—The resin was prepared as in Example 3. Bed vol.=47.5 ml.

(b) *Preparation of feed.*—An organic feed solution was prepared by extracting an acidified aqueous solution of the rare earth chlorides with 1 M di(2-ethylhexyl) phosphoric acid.

The composition of the feed solution was: 1.01 M in di(2-ethylhexyl) phosphate; 0.62 N in exchangeable hydrogen; 0.39 N in total rare earths.

The volume of this solution fed to the column was 50 ml. Flow rate ca. 1 ml./minute.

(c) *Elution.*—Elution was effected with 1 M di(2-ethylhexyl) phosphoric acid in toluene at 1 ml./minute.

Figure 4:
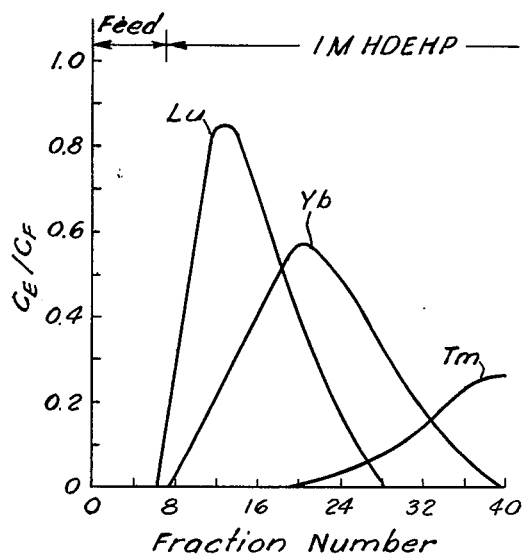

(d) *Analysis.*—Fractions of the effluent product were collected and analyzed by X-ray fluorescence. The elution waves of the individual rare earths (Lu, Yb, and Tm), shown in FIGURE 4, indicate the separations made.

What is claimed is:

1. In a method for separating at least two members of the group consisting of lanthanide and actinide series metal salts of different kinds from one another wherein said salts are dissolved in a water-immiscible liquid organic solvent of the group consisting of trialkyl phosphates and acidic alkyl-phosphoric acid esters having 1 to 2 alkyl groups, the alkyl groups of each of which group members have from 4 to 20 carbon atoms, and the metal salts are thereafter selectively extracted from said solution thereof by contact with an aqueous liquid in which the metal salts are soluble, the improvement wherein said organic solution of said metal salts is contacted with a bed of water-swollen granular ion exchange resin having water absorbed in the ion exchange resin granules and eluting the absorbed metal values from the water-swollen resin by contact with said liquid organic water-immiscible solvent which selectively elutes the metal values.

2. Method for separating at least two members of the group consisting of lanthanide and actinide series metal salts which comprises passing a solution of said metal salts of mineral acids dissolved in a water-immiscible liquid organic solvent of the group consisting of trialkyl phosphates the alkyl groups of which each have from 4 to 20 carbon atoms, which forms ion association complexes with said metal salts, into contact with a bed of particulate surface etherified anion exchange resin, the particles of which are water-swollen by absorbed water whereby said metal salts are selectively extracted from said organic solvent by the absorbed water in the resin and thereafter selectively eluting said metal salts from said water-swollen resin with said water-immiscible liquid organic solvent.

3. Method of claim 1, wherein the water-swollen resin is a strongly basic quaternary ammonium anion exchange resin in the salt form.

4. Method of separating at least two members of the group consisting of lanthanide and actinide series metal salts which comprises passing a solution, in an acidic alkyl phosphoric acid ester having 1 to 2 alkyl groups wherein the alkyl groups have from 4 to 20 carbon atoms, of said metal salts of said acidic alkylphosphoric acid ester, in contact with a water-swollen particulate cation exchange resin, whereby said metal salt cations are selectively exchanged onto said cation exchange resin and thereafter selectively eluting said metal salt cations from said resin with at least one of said alkylphosphoric acid esters.

5. Method of claim 4, wherein the resin is a sulfonic acid cation exchange resin.

6. Method of claim 4, wherein the alkylphosphoric acid ester is di(2-ethylhexyl) phosphoric acid.

7. Method of separating at least two members of the group consisting of lanthanide and actinide series metal salts which comprises passing a solution in a water-immiscible liquid organic solvent of the group consisting of trialkyl phosphates the alkyl groups of which each have from 4 to 20 carbon atoms, which forms ion association complexes with said metal salts, of said metal salts, in contact with a bed of a water-swollen particulate cation exchange resin whereby said metal salt cations are exchanged onto said cation exchange resin and thereafter selectively eluting said heavy metal values from said resin with an acidic alkylphosphoric acid ester having 1 to 2 alkyl groups, which each have from 4 to 20 carbon atoms.

8. The method of claim 7, wherein the resin is a sulfonic acid cation exchange resin.

9. The method of claim 7, wherein the water-swollen resin is a completely water-swollen sulfonic acid cation exchange resin.

10. Method of separating lanthanide series metal salts which comprises passing a solution, in an acidic alkylphosphoric acid ester having 1 to 2 alkyl groups wherein the alkyl groups have from 4 to 20 carbon atoms, of mixed lanthanide series metal salts of said acidic alkylphosphoric acid ester, in contact with a water-swollen, particulate cation exchange resin, whereby lanthanide series metal salt cations are selectively exchanged onto said cation exchange resin and thereafter selectively eluting said metal salt cations from said resin with at least one of said alkylphosphoric acid esters.

References Cited in the file of this patent

UNITED STATES PATENTS

| | | |
|---|---|---|
| 2,728,633 | Arden | Dec. 27, 1955 |
| 2,840,451 | Katzin | June 24, 1958 |
| 2,925,431 | Choppin | Feb. 16, 1960 |

OTHER REFERENCES

J. Inorg. & Nucl. Chem., vol. 4 (1957), Seargill, pp. 304–314 and Peppard, 326–343. Copy in Scientific Library.